United States Patent [19]
Carter

[11] Patent Number: 5,857,681
[45] Date of Patent: Jan. 12, 1999

[54] CHUCK HAVING FORMED JAWS

[75] Inventor: E. Russell Carter, Fredericksburg, Va.

[73] Assignee: Power Tool Holders Incorporated, Wilmington, Del.

[21] Appl. No.: 841,898

[22] Filed: Apr. 17, 1997

Related U.S. Application Data

[63] Continuation of Ser. No. 409,493, Mar. 23, 1995, Pat. No. 5,701,779.

[51] Int. Cl.$^6$ .............................. B23B 31/12; B21K 1/76
[52] U.S. Cl. ................................ 279/62; 72/356; 279/60; 279/123
[58] Field of Search .............................. 279/60–65, 43.6, 279/46.6, 123, 152, 902; 72/356, 359, 360, 377

[56] References Cited

U.S. PATENT DOCUMENTS

| | | | |
|---|---|---|---|
| 2,713,277 | 7/1955 | Kaul | 72/359 |
| 4,426,872 | 1/1984 | Gatny | 72/377 |
| 4,752,165 | 6/1988 | Wanner | 279/60 |
| 5,286,041 | 2/1994 | Rohm | 279/60 |
| 5,340,128 | 8/1994 | Weiss et al. | 279/60 |
| 5,348,317 | 9/1994 | Steadings et al. | 279/62 |

FOREIGN PATENT DOCUMENTS

| | | |
|---|---|---|
| 210844 | 7/1992 | Japan . |
| WO 9317814 | 9/1993 | WIPO . |

*Primary Examiner*—Steven C. Bishop
*Attorney, Agent, or Firm*—Dority & Manning, P.A.

[57] ABSTRACT

A chuck for use with a manual or powered driver including a nut rotatably mounted on the chuck body and in engagement with the threads of the chuck jaws. Aspects of the chuck jaws, such as the jaw face, are manipulatively formed by selective redistribution of metal. Formation of the chuck jaws in this manner is distinguishable from jaws formed by prior art machining techniques due to the structural orientation of grain in the metal. Forming of the chuck jaws preferably occurs at low applied temperature, i.e. not exceeding 1000 degrees Fahrenheit.

15 Claims, 10 Drawing Sheets

CHUCK HAVING FORMED JAWS

This is a continuation, of application Ser. No. 08/409,493, filed Mar. 23, 1995, now U.S. Pat. No. 5,701,779.

BACKGROUND OF THE INVENTION

The present invention relates generally to chucks for use with drills or other tool drivers.

Tool drivers of various types are well known, including hand-actuated drivers as well as electric or pneumatic drivers. Although twist drills are a common tool utilized with such drivers, the tools may also comprise screwdrivers, nut drivers, burrs, mounted grinding stones and other cutting or abrading tools. Since the tools may have shanks of varying diameter or the cross-section of the tool shank may be polygonal, the device is usually provided with a chuck which is adjustable over a relatively wide range. The chuck may be attached to the output shaft of the driver by a threaded or tapered bore.

A variety of chucks have been developed in the art. In one form of chuck, three jaws are circumferentially spaced by approximately 120 degrees from each other. Such jaws are constrained by angularly disposed passageways in a body attached to the driver's output shaft. These passageways are configured so that rotation of the body in one direction relative to a constrained nut engaging the jaws will cause the jaws to grip the cylindrical shank of a tool. Rotation of the body in the opposite direction with respect to the constrained nut releases the gripping relationship of the jaws.

Such a chuck may be keyless if the relative rotation between the body and the nut is effected by hand. One example of such a chuck is disclosed in U.S. Pat. No. 5,348,317, entitled "Chuck." This patent, which is commonly assigned to the present assignee, is incorporated fully herein by reference.

The respective jaws of these chucks include a generally oblique surface defining thereon a "bite" for engaging the tool shank. In the past, the bite has been formed by milling or grinding a "blank" piece of metal having a length substantially equal to the finished length of the jaw. While this technique generally produced suitable jaws, it has not been without disadvantages. For example, because the bite is formed by removal of metal, the blank begins with a volume of metal significantly greater than that of the finished jaw member. In a mass production situation, the cost attributed to the removed metal can be appreciable. Furthermore, the milling or grinding operation utilized to form the bite must be one of relative precision to ensure that the jaw members properly converge to grip the shank of a tool. Accordingly, milling or grinding may introduce problems into the manufacture of chucks.

SUMMARY OF THE INVENTION

The present invention recognizes and addresses the foregoing considerations and others of prior art constructions and methods. Accordingly, it is generally an object of the present invention to provide an improved chuck.

It is a further object of the present invention to provide a chuck incorporating a jaw having a bite portion which is not formed by milling or grinding.

It is a further object of the present invention to provide a jaw having a bite portion manipulatively formed by selective redistribution of metal.

It is a further object of the present invention to provide a method of making a jaw member for use with such a chuck.

Some of these objects are achieved by a chuck for use with a manual or powered driver having a rotatable drive shaft. The chuck comprises a generally cylindrical body member having a forward portion and a rearward portion. The rearward portion has an axial mating bore defined therein to mate with the drive shaft of the driver. The forward portion has an axial receiving bore defined therein and further defines therethrough a plurality of angularly disposed passageways which intersect the receiving bore.

The chuck includes a plurality of elongated jaws slidably positioned in each of the angularly disposed passageways. Each such jaw includes a cylindrical shank portion defining threads on an outer surface thereof. The shank portion integrally extends into a bite portion having a generally oblique surface defining thereon a jaw face. Each of the jaws further has a structural grain orientation characteristic of at least the bite portion being manipulatively formed of a singular piece of metal selectively redistributed. A nut is rotatably mounted relative to the body member so as to engage the threads defined on the jaws such that rotation of the nut will operate the jaws.

A rotatable nut-engaging element may be connected to the nut such that rotation thereof causes the nut to also be rotated. In exemplary constructions, such a nut-engaging element may comprise a generally cylindrical sleeve member received over the forward portion of the body member. Preferably, such a sleeve member may define a gripping surface on an outside thereof to facilitate manual rotation. A rear sleeve member may also be provided and received over the rearward portion of the body member. In an exemplary construction, the chuck further includes a bearing thrust ring located on the body member and at least one anti-friction bearing disposed between the nut and the thrust ring.

Other objects of the invention are achieved by a method of making a jaw member for use with a chuck of the type described. Such a method may comprise the step of first providing a blank of a selected metal. The blank is generally configured as a cylinder of a first predetermined length. As an additional step, the blank is manipulatively formed by selective redistribution of metal into an intermediate configuration having a second predetermined length greater than the first predetermined length. The intermediate configuration has a generally cylindrical shank portion integrally extending into a tapered portion. The tapered portion has a third predetermined length and is characterized by a greater diameter at an intermediate location on the blank extending into a lesser diameter at a first end thereof. The tapered portion is then manipulatively formed by selective redistribution of metal into a bite portion having a generally oblique surface defining thereon a jaw face. The bite portion has substantially the second predetermined length and further has a cross-sectional area at axial locations therealong substantially equivalent to the cross-sectional area of the tapered portion at corresponding axial locations. As a result, a jaw member is produced having a shank portion and a bite portion, as desired.

In an exemplary method of the invention, a circumferential chamfer is manipulatively formed by selective redistribution of metal at the first end of the blank prior to formation of the intermediate configuration. The chamfer defines a first end face of the blank having a predetermined diameter. Preferably, the tapered portion of the intermediate configuration is formed to taper to a minimum diameter at the first end of the blank substantially equivalent to the predetermined diameter. The tapered portion is preferably characterized by a bullet-shaped nonlinear taper.

A circumferential chamfer may also be formed at a second end of the blank opposite the first end. Furthermore, an angled end face may be manipulatively formed at a first end of the blank by selective redistribution of metal. As an additional step, the diameter of the shank portion may be manipulatively reduced to a second predetermined diameter by selective redistribution of metal.

Preferably, no external heat is applied to the material of the blank before formation or the material is heated but not to a temperature exceeding generally 1000 degrees Fahrenheit prior to manipulative forming thereof.

Other objects, features and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

Repeat use of reference characters in the present specification and drawings is intended to represent same or analogous features or elements of the invention.

DETAILED DESCRIPTION OF THE PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary constructions.

Figure 1:
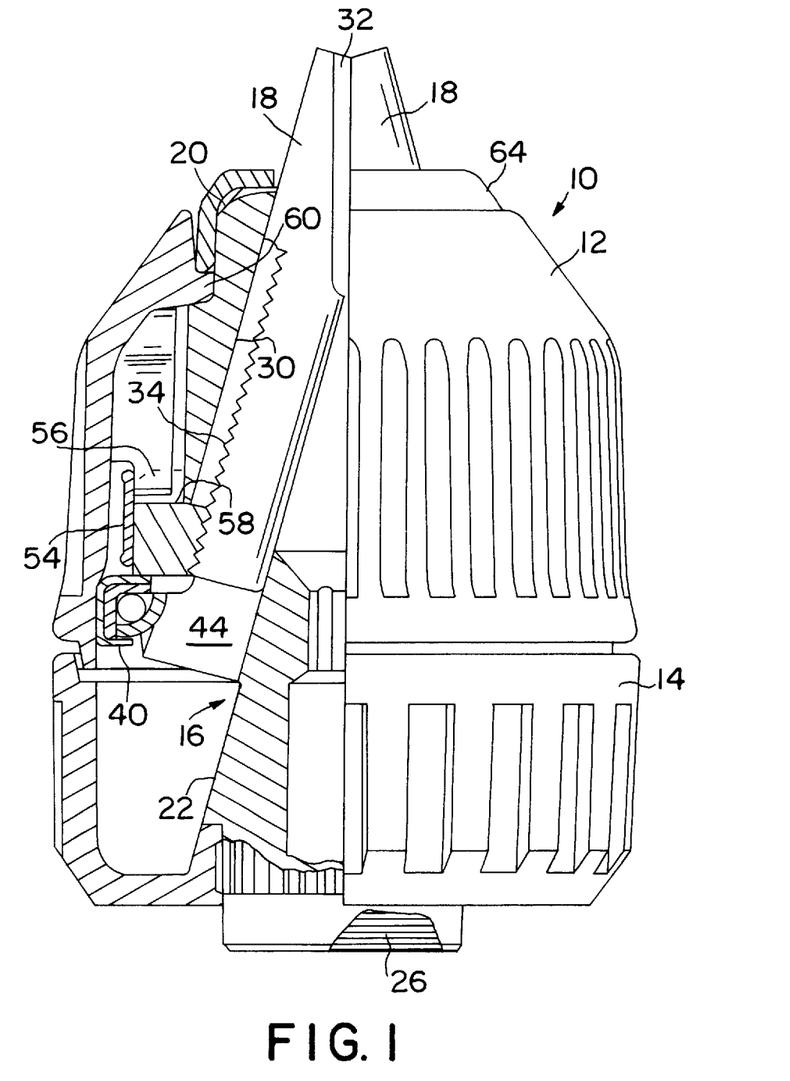
FIG. 1 is a longitudinal view, partially in section, of a chuck constructed in accordance with an embodiment of the present invention.
Figure 2:
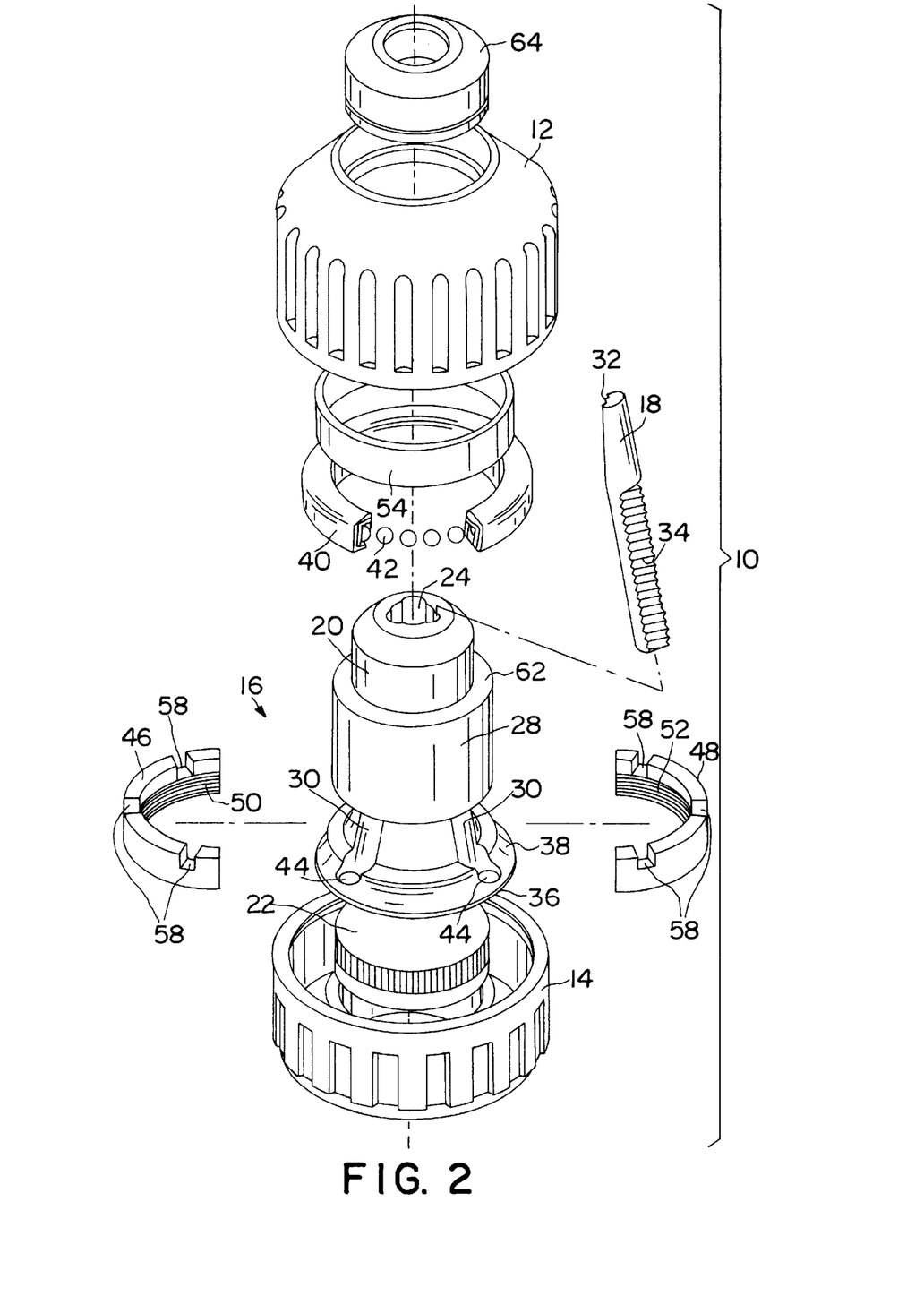
FIG. 2 is an exploded view of the chuck illustrated in FIG. 1.

FIGS. 1 and 2 illustrate a keyless chuck 10 which will be used as a basis for explaining certain aspects of the present invention. In this regard, chuck 10 is merely exemplary of a typical chuck which may be improved according to the invention. Thus, it is to be distinctly understood that the present invention is not limited to the operative configuration of the chuck illustrated. Instead, aspects of the invention are applicable to both keyed and keyless chucks of various operative configurations.

Chuck 10 includes a front sleeve member 12, an optional rear sleeve member 14, a body member 16 and a plurality of jaws 18. As shown, body member 16 is generally cylindrical in shape and comprises a nose or forward portion 20 and a tail or rearward portion 22. An axial receiving bore 24 is formed in nose portion 20 of the body member 16. Receiving bore 24 is somewhat larger than the largest tool shank that chuck 10 is designed to accommodate. A threaded bore 26 is formed in tail portion 22 of body member 16 and is of a standard size to make with the output shaft of a driver (not shown) with which it will be utilized. Bores 24 and 26 may communicate at the central region 28 of body member 16. While a threaded bore 26 is illustrated, such bore could be replaced with a tapered bore of a standard size to mate with a tapered drive shaft.

A plurality of passageways 30 are defined in body member 16 to accommodate respective of jaws 18. Preferably, chuck 10 includes three (3) such passageways 30 separated from each other in this construction by an arc of approximately 120 degrees. The axes of passageways 30 and jaws 18 therein are angled with respect to the chuck axis, intersecting the chuck axis at a common point ahead of body member 16.

Each of jaws 18 has a tool engaging face 32 which is generally parallel to the axis of body member 16. Each of jaws 18 further defines threads 34 on an outer surface thereof generally opposite engaging face 32. One skilled in the art will appreciate that threads 34 may be of any suitable type and pitch within the scope of the present invention.

In this exemplary construction, body member 16 further includes a thrust ring member 36 which may preferably be integral therewith. As shown, thrust ring member 36 includes a thrust face 38 defining an arcuate seating surface for engagement with the inner race of a self-contained anti-friction bearing assembly 40. Bearing assembly 40 includes a plurality of bearing elements 42, here shown as ball bearings. It will be appreciated that thrust ring member 36 includes a plurality of jaw guide ways 44 spaced apart around its circumference to permit retraction of a respective jaw 18 therethrough.

Chuck 10 further includes a nut for engaging the threads 34 of jaws 18. Rotation of the nut with respect to body member 16 causes jaws 18 to be advanced or retracted as desired. Although various configurations of nuts may be utilized within the scope of the present invention, the exemplary chuck illustrated utilizes a split nut having semicircular portions 46 and 48. Portions 46 and 48 have respective threads 50 and 52 defined on their inner circumferential surface, as shown. A retaining band 54 is provided to maintain portions 46 and 48 together as an annular nut when chuck 10 is assembled. It should be appreciated that a one-piece nut, or any other suitable configuration, could also be utilized for this purpose.

In this exemplary construction, front sleeve member 12 is adapted to be loosely fitted over nose section 20 of body member 16. As shown, front sleeve member 12 includes drive ribs 56 which engage slots 58 in portions 46 and 48. As a result, front sleeve member 12 and the nut will be operatively connected, i.e., when front sleeve member 12 is rotated, the nut will rotate therewith.

As shown, front sleeve member 12 includes an annular ledge 60 adapted to rest against a ledge 62 at the base of nose section 20 of body member 16. A nose piece 64 is placed on nose portion 20 behind ledge 60 to maintain front sleeve member 12 in position. In this case, nose piece 64 is dimensioned to maintain a press fit on nose portion 20. It should be appreciated that nose piece 64 may also be secured in some cases by snap fit, threading or the like.

As described above, chuck jaws have typically been formed by milling or grinding a cylindrical "blank." This technique requires that the blank have at least the length and diameter as the jaw into which it will be made. Metal removed in the formation of the engaging face and other features of the jaw is largely wasted.

Figure 3:
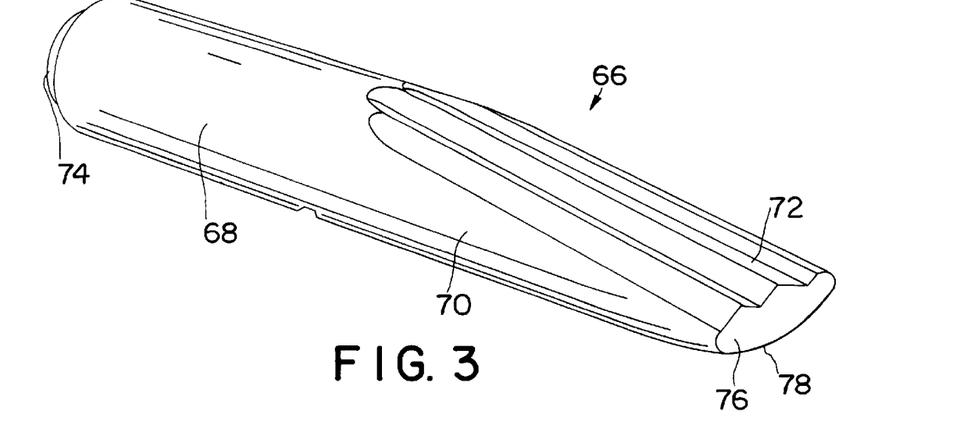
FIG. 3 is an enlarged perspective view of a jaw member constructed in accordance with the present invention.

Referring now to FIG. 3, a jaw member 66 produced according to the present invention is illustrated which may have threads defined thereon to produce a jaw such as jaw 18. As can be seen, jaw member 66 includes a shank portion 68 integrally extending into a bite portion 70. The generally oblique surface 72 on bite portion 70 defines an engaging, or "jaw," face such as that referenced as 32 in FIGS. 1 and 2. In the illustrated embodiment, this engaging face is formed to have a surface configuration in the direction transverse to its axial extent resembling a "W." It should be appreciated, however, that other suitable configurations, such as a "V," may also be produced according to the present invention.

A circumferential chamfer 74 may be defined at the "trailing end" of member 66 adjacent shank portion 68. An end face 76 is formed at the opposite, "leading end" of member 66. End face 76 may be angled as shown along a plane so that surface 72 extends axially farther than the arcuate back 78 of bite portion 70. As a result of this angled orientation, end face 76 will be approximately perpendicular to the longitudinal axis of chuck 10 when installed therein.

As will now be described, member 66 has been formed to this stage from a generally cylindrical blank without removal of metal. In other words, the various illustrated features including oblique surface 72 and the jaw face defined thereon are produced by "manipulative formation" of the blank. In this process, the metal of the blank is selectively redistributed so that these features are produced.

Figure 4:
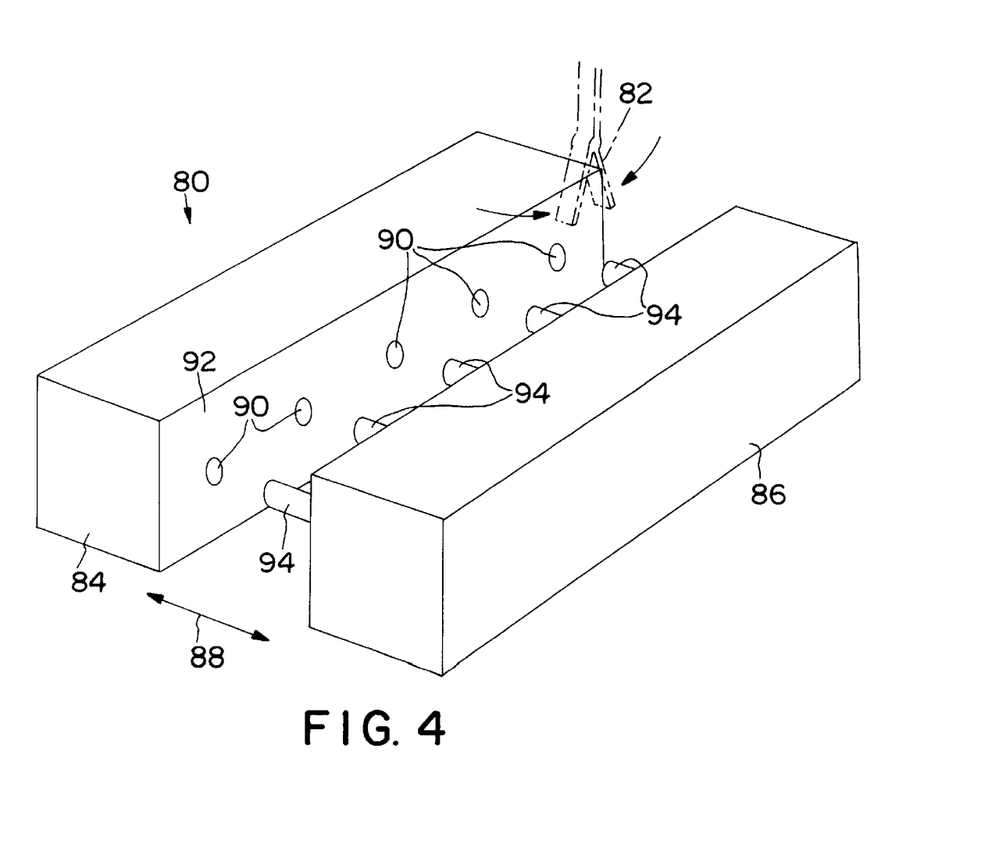
FIG. 4 is a diagrammatic representation of a five-station forming machine which may be utilized to produce a jaw member such as that shown in FIG. 3.

Referring now to FIG. 4, a forming machine (generally indicated at 80) is diagrammatically illustrated which may be utilized to manipulatively produce a member such as 66. As will be explained more fully below, machine 80 includes a plurality of stations at which various aspects occur in the formation of member 66. In presently preferred embodiments, machine 80 includes five (5) such stations. Five (5) gripping or transfer mechanisms, such as that indicated at 82, are provided to move the blank from station to station.

Machine 80 includes a first portion 84 and a second portion 86 having planar faces situated in opposition to one another as shown. In this case, portion 86 is adapted to reciprocatively move with respect to portion 84, as indicated by arrow 88. Each forming station is represented in this view by a hole 90 defined in face 92 of portion 84 and an associated punch 94 extending from the opposing face of portion 86. As portion 86 is moved toward portion 84, the punch pushes the blank into the associated hole. As a result of this movement, the blank tends to conform to the shape of a die located inside of portion 84 at the particular station.

It will be appreciated that multiple stations are provided in machine 80 so that member 66 may be formed in multiple successive stages. This technique is utilized because an attempt to form member 66 from a generally cylindrical blank in one stage would often be extremely difficult. By forming member 66 in discrete stages, consistent and effective manipulative formation thereof may be achieved. Preferably, machine 80 has a blank at each station during movement of portion 86 toward portion 84. Thus, a number of blanks equal to the number of stations will be in the process of being formed in order to achieve manufacturing efficiency.

Figure 5A:
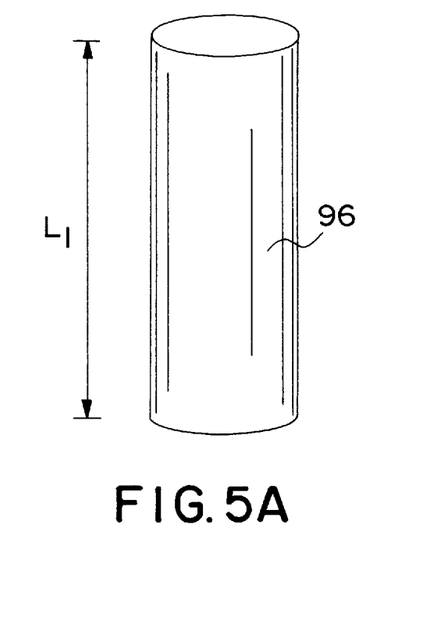
FIG. 5A is a perspective view of a blank which may be utilized as a starting piece of metal to produce a jaw member such as that shown in FIG. 3.
Figure 5B:
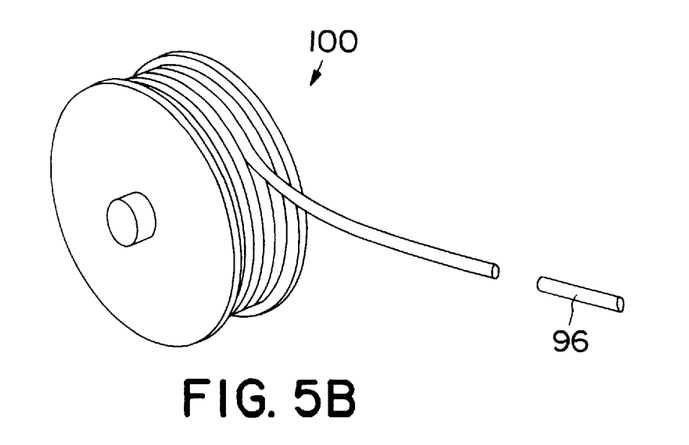
FIG. 5B diagrammatically illustrates the blank of FIG. 5A as severed from a coil of metal wire.

The various stages through which a blank may be formed into member 66 will now be described. FIG. 5A illustrates a cylindrical blank 96 which may be utilized to produce member 66 according to the present invention. As shown, blank 96 has a length $L_1$ and a diameter sufficient to define a volume of metal substantially equivalent to that of member 66. As indicated in FIG. 5B, blank 96 is typically severed from a coil 100 of metal wire utilizing a suitable cutting means. Generally, blank 96 will be steel or an appropriate alloy thereof. For example, it is believed that a medium carbon carbon steel, such as a steel having a 38–45 carbon range and some lead, may be suitable for this purpose. Other suitable metals or appropriate materials, however, may also be utilized within the scope of the present invention.

Figure 6A:
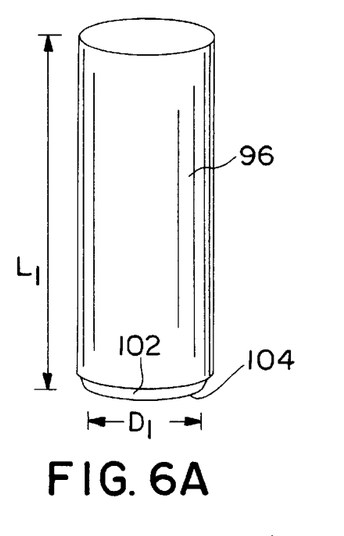
FIG. 6A illustrates the blank as formed after a first stage of the machine of FIG. 4.

Referring now to FIG. 6A, a circumferential chamfer 102 is formed at the leading end of blank 96 in the first stage of machine 80. Chamfer 102 defines a circular end face 104 having a diameter $D_1$. Chamfer 102 may be manipulatively formed by pushing blank 96 into a complementary die 106 in portion 84 via one of punches 94, such as that shown in FIG. 6B. As shown, blank 96 may retain a length of approximately $L_1$ at this stage.

Figure 6B:
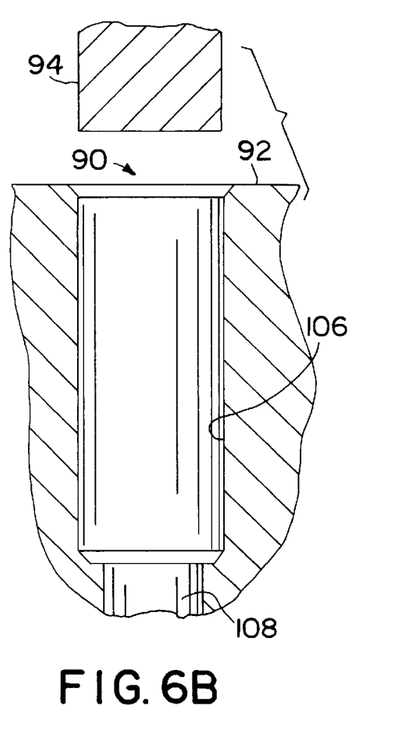
FIG. 6B illustrates a die utilized in the machine of FIG. 4 to produce the configuration of FIG. 6A.

After chamfer 102 is formed, punch 94 is retracted. Blank 96 may then be removed from die 106 utilizing a removal pin inside of portion 84. An axial passage 108 is defined in portion 84 so that the removal pin can engage the leading end of blank 96 and push it back out through the respective of holes 90. Although not explicitly described herein, it will be appreciated that other stations of machine 80, except the final station in many cases, will also typically use removal pins to effect removal of blank 96 from the associated die.

Figure 7A:
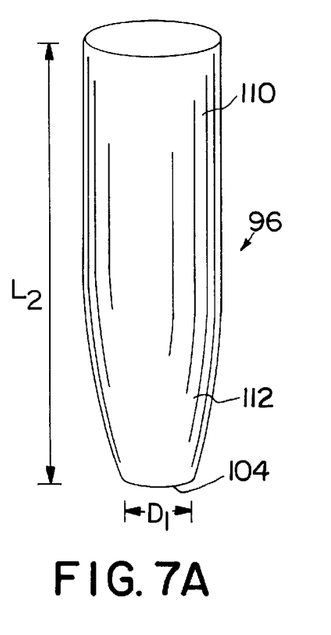
FIG. 7A illustrates the blank as formed after a second stage of the machine of FIG. 4.

The shape of blank 96 after the second stage of machine 80 is illustrated in FIG. 7A. As can be seen, blank 96 is elongated in this intermediate configuration to a length $L_2$, which is preferably greater than length $L_1$. Here, blank 96 includes a cylindrical shank portion 110 integrally extending into a tapered portion 112. As shown, the diameter of tapered portion 110 is progressively reduced in the direction of end face 104, which preferably remains substantially at the value of $D_1$ after this stage of manipulative formation.

Figure 7B:
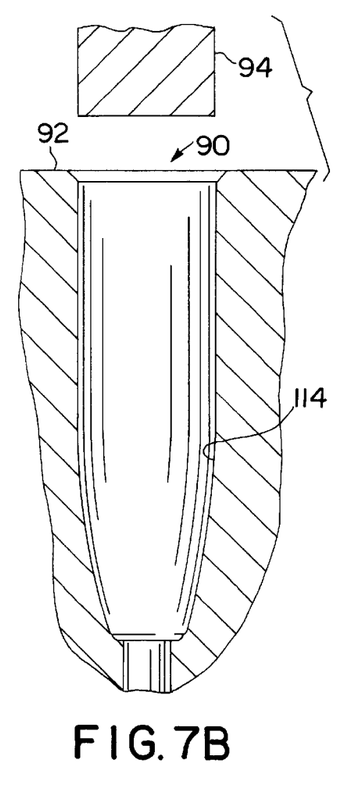
FIG. 7B illustrates a die utilized in the machine of FIG. 4 to produce the configuration of FIG. 7A.

Preferably, tapered portion 112 has a "bullet shape" in which the taper is nonlinear. As will be explained more fully below, the cross-sectional area of tapered portion 112 will preferably be substantially equivalent to the cross-sectional area of the desired final jaw member 66 at corresponding axial locations. This configuration facilitates the formation of the relatively complex detail of the jaw face defined on oblique surface 72. An appropriate die for forming this intermediate configuration of blank 96 is shown in FIG. 7B and referenced therein at 114.

Figure 8A:
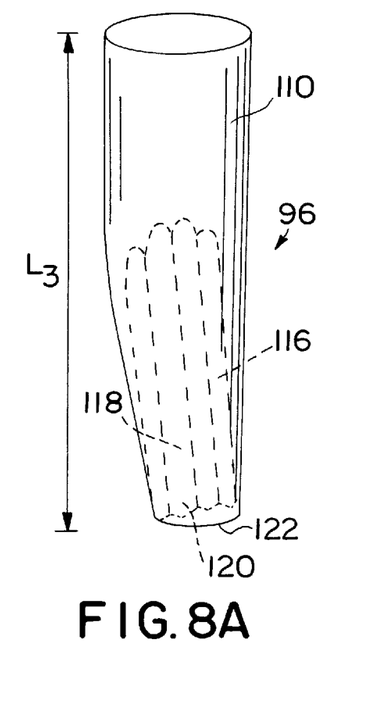
FIG. 8A illustrates the blank as formed after a third stage of the machine of FIG. 4.

FIG. 8A illustrates the configuration of blank 96 after the third stage of machine 80. As shown, tapered portion 112 has now been formed into a bite portion 116. Bite portion 116 includes a generally oblique surface 118 defining thereon a jaw face of the desired configuration. The back of tapered portion 116 is configured as a generally semi-circular surface 120 as shown. It will be appreciated that semicircular surface 120 will have substantially the same radius as shank portion 110 and will be substantially a continuation thereof.

Figure 8B:
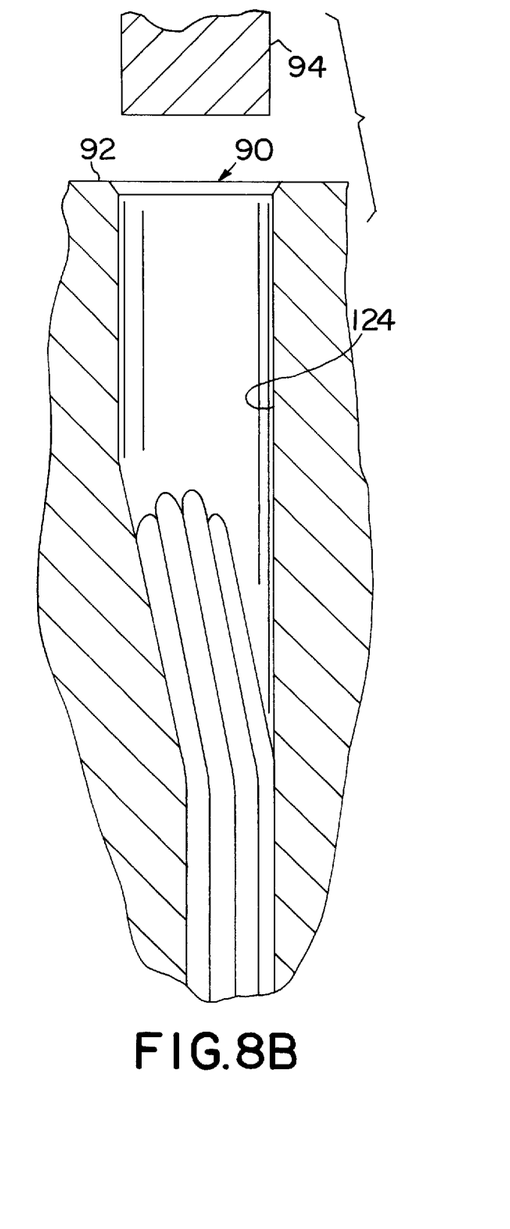
FIG. 8B illustrates a die utilized in the machine of FIG. 4 to produce the configuration of FIG. 8A.

End face 104 has been transformed into end face 122 having the illustrated configuration. For reasons which will be explained more fully below, end face 122, while no longer circular in configuration, will nevertheless have a surface area substantially equivalent to end face 104. At this stage, blank 96 will have a length of $L_3$. Length $L_3$, which may be greater than length $L_1$, will preferably be substantially the final length of member 66. A suitable die for forming this iteration of blank 96 is illustrated in FIG. 8B and referenced therein as 124.

Figure 9A:
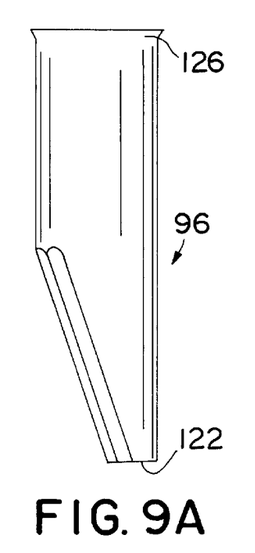
FIG. 9A is another view of the blank as it appears as formed after the third stage of the machine of FIG. 4.

Similar to FIG. 8A, FIG. 9A illustrates the configuration of blank 96 after the third stage of machine 80. In FIG. 9A, however, a burr 126 such as may appear at the trailing end of blank 96 is shown in exaggerated form. Such a burr may be caused by the successive pounding action of punches 94.

Figure 9B:
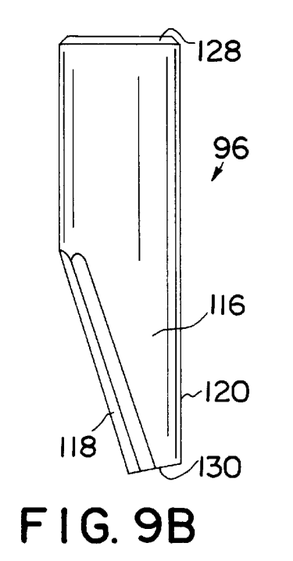
FIG. 9B illustrates the blank as formed after a fourth stage of the machine of FIG. 4.

FIG. 9B illustrates blank 96 as formed after the fourth stage of machine 80. As can be seen, the trailing end now has a circumferential chamfer 128 defined thereabout instead of burr 126. Additionally, end face 122 has been angled as shown to produce an angled end face 130.

Figure 9C:
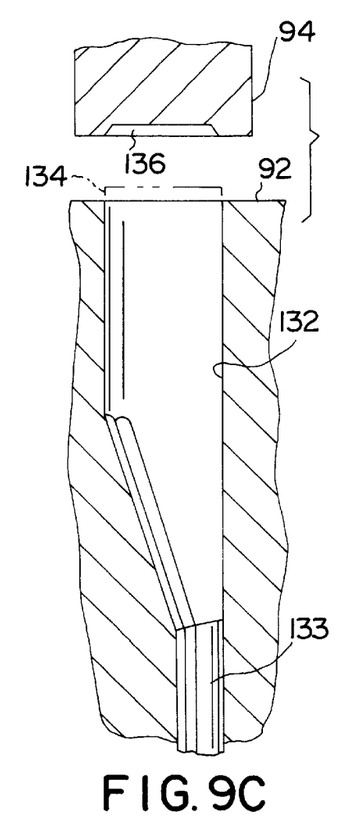
FIG. 9C illustrates a die utilized in the machine of FIG. 4 to produce the configuration of FIG. 9B.

FIG. 9C illustrates a suitable die 132 for use in producing this stage of blank 96 illustrated in FIG. 9B. It will be appreciated that blank 96 must be prevented from undesirable rotation in clamping mechanism 82 when moved from the third station to the fourth station to ensure that bite portion 116 will be properly aligned in die 132.

Angled end face 132 may be formed by a complementary surface on ejector pin 133, which preferably remains in the position shown as blank 96 is inserted into die 132. Furthermore, to produce chamfer 128, die 132 is configured so that a portion 134 of the trailing end of blank 96 will extend from face 92. Punch 94 is modified at this station to define a recess 136 generally complementary to chamfer 128. Engagement of blank 96 with recess 136 thus produces chamfer 128, as desired.

Figure 10:
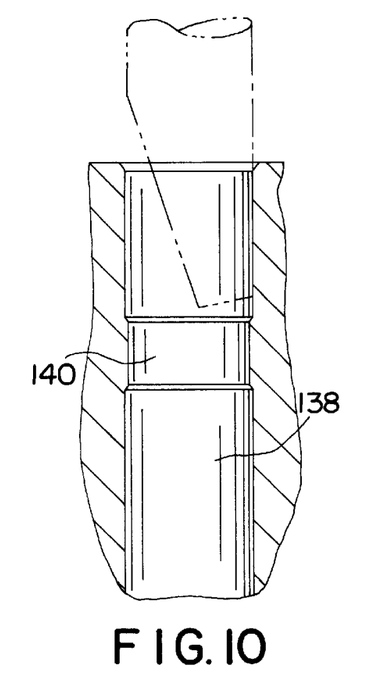
FIG. 10 illustrates a die for use in the fifth stage of the machine of FIG. 4.

At the fifth stage of machine 80, blank 96 is subjected to a final sizing. Specifically, blank 96 is preferably passed through a bore 138 having a reduced diameter portion 140. The inner diameter of portion 140 is preferably substantially equal to the desired outer diameter of member 66. Thus, after being passed through bore 138, blank 96 has achieved the configuration of member 66 shown in FIG. 3.

Figure 11:
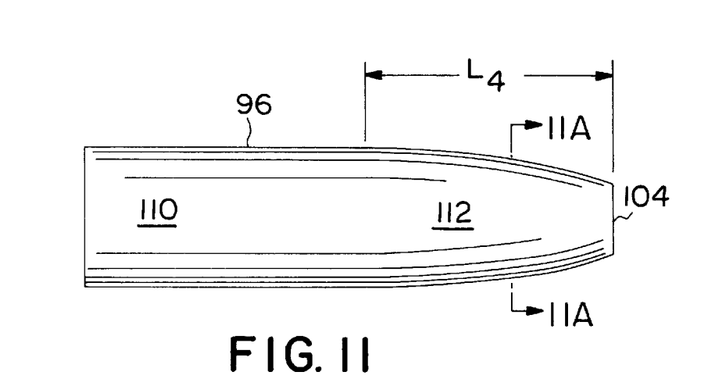
FIG. 11 is an enlarged elevational view of an intermediate configuration of the blank as formed after the third stage of the machine of FIG. 4.
Figure 12:
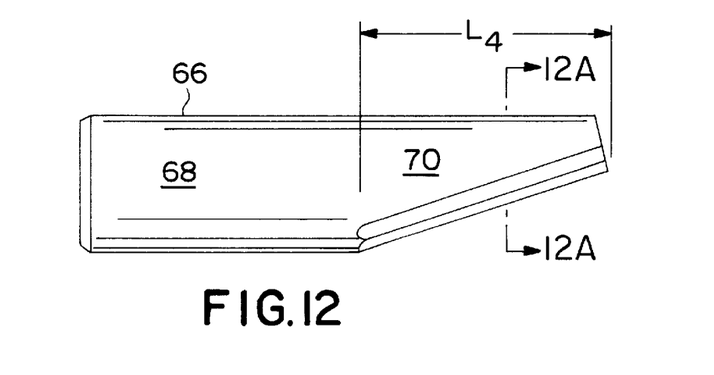
FIG. 12 is an enlarged cross-sectional view of a jaw member as formed after the fifth stage of the machine of FIG. 4.

Referring now to FIGS. 11 and 12, a significant aspect of the present invention will now be explained. Specifically, FIG. 11 illustrates the intermediate configuration of blank 96 after the third stage of machine 80. As shown, the length of tapered portion 112 from end face 104 to the location at which it extends into shank 110 may be expressed as length $L_4$. FIG. 12 illustrates member 66 after the fifth stage of formation as discussed above. As can be seen, the length of bite portion 70 will generally also have the length $L_4$. Thus, a given axial location within tapered portion 112 will correspond to a given axial location within bite portion 70.

Figure 11A:
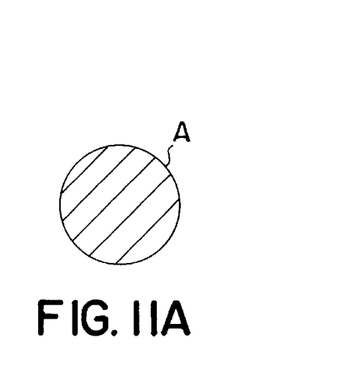
FIG. 11A is a cross-sectional view as taken along lines 11A—11A of FIG. 11.
Figure 12A:
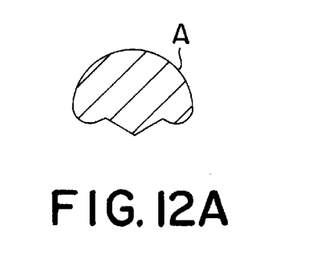
FIG. 12A is a cross-sectional view as taken along lines 12A—12A of FIG. 12.

As illustrated in FIGS. 11A and 12A, the cross-section at respective of these axial locations will have a different geometric configuration. Nevertheless, the cross-sectional area of member 66 and blank 96 at corresponding axial locations will be substantially equivalent. This cross-sectional area may be designated as area A.

The correspondence in area as described has been found useful in manipulatively forming the relatively complicated shape of bite portion 70 from a blank which is axially symmetrical. For example, an attempt to produce bite portion 70 directly from a cylindrical blank may result in "sticking" in the die. The present invention eliminates such "sticking" and effectively produces bite portion 70 by providing tapered portion 112 having cross-sectional areas equivalent to cross-sectional areas in corresponding axial locations. This configuration allows the metal to be effectively redistributed within the die.

An important aspect of the present invention is the temperatures at which member 66 may be formed. Specifically, member 66 may be formed at temperatures significantly below the melting temperature of the metal. Preferably, the manipulative formation of blank 96 into member 66 is effected at applied temperatures which generally do not exceed 1000 degrees Fahrenheit. Often, it may be desirable to effect the manipulative formation at room temperature although it should be understood that friction during metal movement will create an internal temperature increase. In other cases, it may be desirable to apply some external heat to the material prior to formation. The optimum temperature in such a situation will depend on the particular material, but will generally be less than 1000 degrees Fahrenheit as discussed above. These relatively low temperatures are desirable because shrinkage of blank 96 may be experienced at higher temperatures, such as may be used for hot forging.

Figure 13:
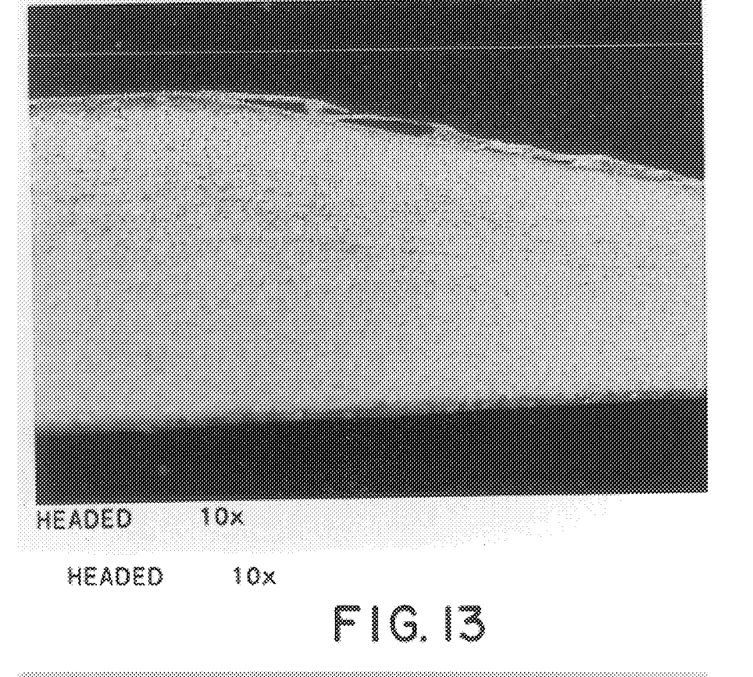
FIGS. 13 and 14 are respective photomicrographs at ten (10) times magnification of an axial cross-section of a portion of a jaw formed according to the present invention and a corresponding portion of a jaw produced according to a prior art method.
Figure 14:
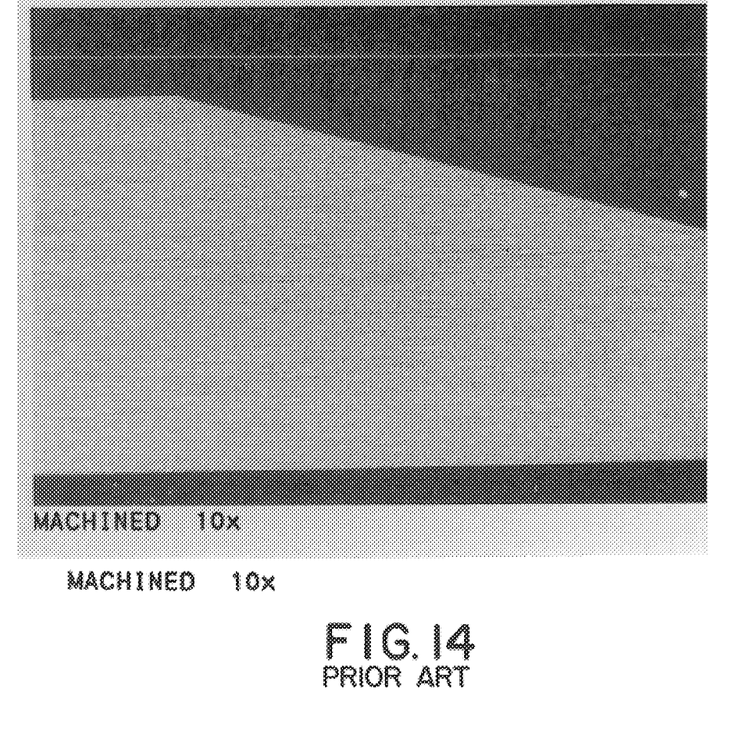

FIGS. 13 and 14 are respective photomicrographs in axial cross-section of a portion of a jaw produced according to the present invention and according to prior art machining techniques. The particular photomicrographs shown have a magnification of ten (10) times. As can be seen, the structural grain orientation of the machined jaw is substantially axial throughout. On the other hand, it can be seen that the structural grain orientation of the jaw produced according to the present invention is significantly different. In this case, the grain is directionally oriented to extend generally in parallel with the oblique surface.

Figure 15:
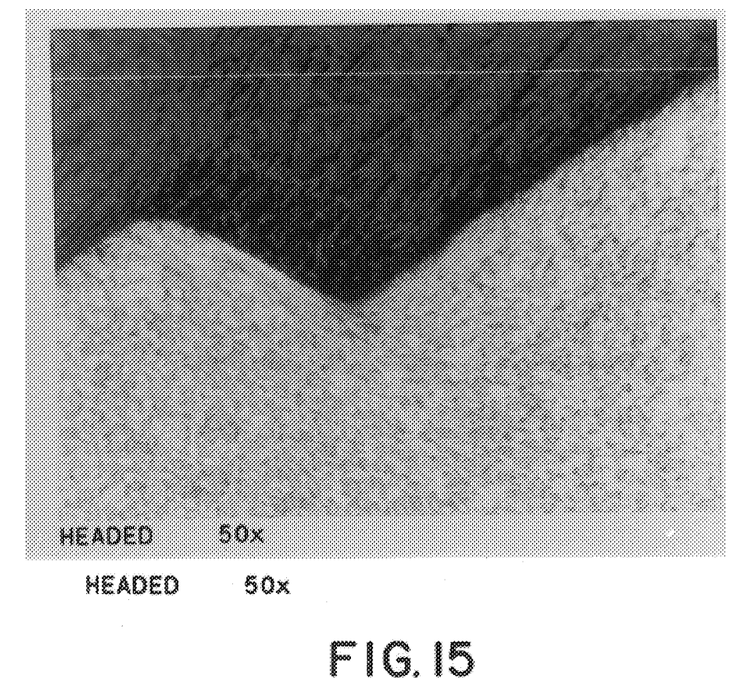
FIGS. 15 and 16 are respective photomicrographs at fifty (50) times magnification of a transverse cross-section of a jaw formed according to the present invention and a jaw produced according to a prior art method.
Figure 16:
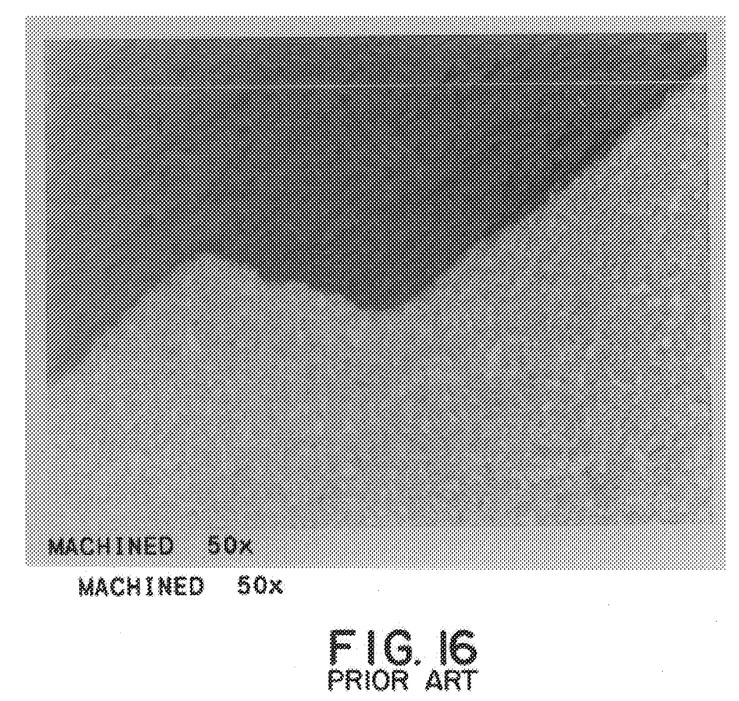

Transverse cross-sections at fifty (50) times magnification of a jaw member produced according to the invention and prior art machining techniques are respectively shown in FIGS. 15 and 16. Specifically, these photomicrographs show a portion of the "W" shape of the jaw face. In the prior art jaw, it can be seen that the metallic grain is oriented in a direction substantially orthogonal to the photomicrograph. In other words, the grain orientation extends "into" the photomicrograph along the line of sight of the viewer. In the jaw produced according to the present invention, on the other hand, it can be seen that the structural grain orientation follows to some extent the configuration of the outer surface.

While preferred embodiments of the invention and presently preferred methods of practicing the same have been described, modifications and variations may be practiced thereto by those of ordinary skill in the art without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to be limitative of the invention so further described in such appended claims.

What is claimed is:

1. A chuck for use with a manual or powered driver having a rotatable drive shaft, said chuck comprising:
    a generally cylindrical body member having a forward portion and a rearward portion, said rearward portion having an axial mating bore defined therein to mate with said drive shaft of said driver, said forward portion having an axial receiving bore defined therein and further defining therethrough a plurality of angularly disposed passageways intersecting said receiving bore;
    a plurality of elongated jaws slidably positioned in each of said angularly disposed passageways, each of said jaws having a cylindrical shank portion defining threads on an outer surface thereof, said shank portion integrally extending into a bite portion having a generally oblique surface defining thereon a jaw face;
    each of said jaws being constructed of a singular piece of material and having a structural grain orientation wherein the structural grain proximate said oblique surface extends generally parallel to said oblique surface; and
    a nut rotatably mounted relative to said body member so as to engage said threads defined on said jaws such that rotation of said nut operates said jaws.

2. A chuck for use with a manual or powered driver as in claim 1, further comprising a rotatable nut-engaging element connected to said nut such that rotation thereof causes said nut to be rotated.

3. A chuck for use with a manual or powered driver as in claim 2, wherein said rotatable nut-engaging element comprises a generally cylindrical sleeve member received over the forward portion of said body member.

4. A chuck for use with a manual or powered driver as in claim 3, wherein said sleeve member defines a gripping surface on an outside thereof to facilitate manual rotation.

5. A chuck for use in a manual or powered driver as in claim 4, further including a rear sleeve member received over the rearward portion of said body member.

6. A chuck for use in a manual or powered driver as in claim 3, further including a bearing thrust ring located on said body member and at least one anti-friction bearing disposed between said nut and said thrust ring.

7. A jaw member for use with a chuck of the type utilized with a manual or powered driver having a rotatable drive shaft, said jaw member comprising:
    a singular piece of metal configured having a cylindrical shank portion defining threads on an outer surface thereof, said shank portion integrally extending into a bite portion having a generally oblique surface defining thereon a jaw face; and
    said jaw member being constructed from a singular piece of material and having a structural grain orientation wherein the structural grain proximate said oblique surface extends generally parallel to said oblique surface.

8. A jaw member as set forth in claim 7, wherein said jaw member is a chuck jaw having threads defined on an outer surface of said shank portion.

9. A jaw for use with a chuck of the type utilized with a manual or powered driver having a rotatable drive shaft, said jaw produced by a method comprising steps of:
    (a) providing a blank of a selected material, said blank generally configured as a cylinder of a first predetermined length;
    (b) manipulatively forming by selective redistribution of material said blank into an intermediate configuration having a second predetermined length greater than said first predetermined length, said intermediate configuration having a generally cylindrical shank portion integrally extending into a tapered portion, said tapered portion having a third predetermined length and a diameter decreasing in the direction of a first end from a maximum diameter at an intermediate location on said blank adjacent said shank portion;
    (c) manipulatively forming by selective redistribution of material said tapered portion of said intermediate configuration into a bite portion having a generally oblique surface defining thereon a jaw face; and
    (d) cutting threads into an outer surface of said generally cylinderical shank portion to thereby form said jaw.

10. A jaw for use with a chuck of the type utilized with a manual or powered driver having a rotatable drive shaft, said jaw produced by a method comprising steps of:
    (a) providing a blank of a selected material, said blank generally configured as an elongated cylinder;
    (b) manipulatively forming by selective redistribution of material said blank into an intermediate configuration having a tapered portion; and
    (c) manipulatively forming by selective redistribution of material a bite portion of said blank after said blank is formed into said intermediate configuration, said bite portion having a generally oblique surface defining thereon a jaw face.

11. A jaw as in claim 10, wherein said intermediate configuration has a generally cylindrical shank portion integrally extending into a tapered portion.

12. A jaw as in claim 11, wherein said tapered portion has a diameter decreasing in the direction of a first end from a maximum diameter at an intermediate location on said blank adjacent said shank portion.

13. A jaw as in claim 10, wherein said bite portion is formed in said tapered portion.

14. A jaw as in claim 10, wherein said tapered portion of said intermediate configuration is characterized by a bullet-shaped nonlinear taper.

15. A jaw for use with a chuck of the type utilized with a manual or powered driver having a rotatable drive shaft, said jaw produced by a method comprising steps of:
    (a) providing a blank of a selected material, said blank generally configured as an elongated cylinder of a first predetermined length;
    (b) manipulatively forming by selective redistribution of material said blank into an intermediate configuration having a second predetermined length greater than said first predetermined length; and
    (c) manipulatively forming by selective redistribution of material a bite portion of said blank after said blank is formed into said intermediate configuration, said bite portion having a generally oblique surface defining thereon a jaw face.

* * * * *